(12) United States Patent
Hubbard

(10) Patent No.: US 7,755,482 B2
(45) Date of Patent: Jul. 13, 2010

(54) METHOD AND APPARATUS FOR TOOLBOX INVENTORY

(75) Inventor: Darryl G. Hubbard, Carrollton, TX (US)

(73) Assignee: Electronic Inventory Solutions, Inc., Austin, TX (US)

( * ) Notice: Subject to any disclaimer, the term of this patent is extended or adjusted under 35 U.S.C. 154(b) by 521 days.

(21) Appl. No.: 11/468,172

(22) Filed: Aug. 29, 2006

(65) Prior Publication Data

US 2008/0059338 A1   Mar. 6, 2008

(51) Int. Cl.
  *G08B 13/14* (2006.01)
  *B60R 25/00* (2006.01)
(52) U.S. Cl. ............... 340/568.1; 340/5.92; 340/572.1; 340/825.49; 235/385
(58) Field of Classification Search .................. None
  See application file for complete search history.

(56) References Cited

U.S. PATENT DOCUMENTS

| | | | |
|---|---|---|---|
| 6,737,961 B2 * | 5/2004 | Flick | 340/426.35 |
| 6,989,749 B2 * | 1/2006 | Mohr | 340/572.1 |
| 7,116,228 B1 * | 10/2006 | Singleton | 340/572.1 |
| 7,183,894 B2 * | 2/2007 | Yui et al. | 340/5.7 |
| 7,336,181 B2 * | 2/2008 | Nowak et al. | 340/572.1 |
| 7,339,477 B2 * | 3/2008 | Puzio et al. | 340/572.1 |
| 7,504,949 B1 * | 3/2009 | Rouaix et al. | 340/572.1 |
| 7,556,194 B2 * | 7/2009 | Rogoyski | 235/385 |
| 2003/0102970 A1 * | 6/2003 | Creel et al. | 340/568.1 |
| 2004/0217864 A1 * | 11/2004 | Nowak et al. | 340/572.1 |
| 2006/0259964 A1 * | 11/2006 | Maldonado et al. | 726/16 |

* cited by examiner

*Primary Examiner*—F. Ryan Zeender
*Assistant Examiner*—Dana Amsdell
(74) *Attorney, Agent, or Firm*—Lee & Hayes, PLLC

(57) ABSTRACT

A method and apparatus is provided for electronically inventorying an electronically locked and unlocked toolbox before and after RFID (Radio Frequency IDentified) tagged tools are accessed by an authorized user. A record is generated and stored of tools added and/or removed along with the identity of the accessing user. At anytime it is desired, a record may be generated of tagged tools in the toolbox or, alternatively, a list of tagged tools missing from assigned positions in the toolbox.

7 Claims, 5 Drawing Sheets

METHOD AND APPARATUS FOR TOOLBOX INVENTORY

FIELD OF THE INVENTION

The present invention relates generally to electronically inventorying RFID (Radio Frequency Identifier) tagged tools in a receptacle.

DESCRIPTION OF THE RELATED ART

When tools are used in a manufacturing environment, it is important that they be returned to a source receptacle after use. Employers typically perform a manual inventory of the source receptacle to minimize or eliminate the problem of employee theft of expensive tools. Companies can conduct random audits of employee's toolbox to prevent theft and monitor tool location. Another reason for such an inventory is to prevent the problems associated with leaving tools in the workplace environment where they could cause damage. One example of damage is where medical instruments are accidentally left, by a doctor or staffs within a patient's body cavity, after a medical operation is complete. In a similar manner, any environment where machinery is repaired or serviced would also benefit from being able to quickly ascertain that all tools used in a given project, have been returned to a given repository.

In the aerospace industry hand tools are used to manufacture, modify, and maintain aircraft. Inventory control over these hand tools is critical to prevent Foreign Object Damage (FOD) from being left in the aircraft. FOD is defined as any object not structurally part of the aircraft. The most common foreign objects found are nuts, bolts, safety wire, and hand tools.

Typically, technicians or mechanics supply their own tools, and may have a list of the tools in a toolbox. The technician or mechanic has the personal responsibility of inventorying their own toolbox at the completion of each task and/or at the end of a shift.

When the company supplies the tools needed, one approach to inventory control is the use of nickel size metal tokens referred to as chits. These chits are stamped with the same serial number. The technician or mechanic signs out a number of chits having the same serial number. Alternately, the chits may contain a picture of the employee and the employee's Employee Identification Number (EIN). These company-supplied tools are kept in toolboxes that can have foam mats with grooved or etched out areas where only the tool that belongs in a particular spot will fit in that spot. When a technician or mechanic needs a tool to perform a task he or she will remove the tool and place one of their chits, in or on the now empty etched out area. At the completion of the task or end of shift, whichever comes first, the technician or mechanic will replace the tools he or she has checked out and retrieve their chits. Afterward, the technician or mechanic inventories their chits to ensure they have returned all tools. At the beginning and end of each shift, the shift supervisor manually inventories the entire toolbox to ensure all tools are accounted for and/or checked out with a chit. There have been numerous incidences where a missing tool has escaped notice during this inventory process for as many as two to three or more inspection cycles.

In the airline industry, when a tool has been established as "missing" the first course of action is to try to determine which aircraft was the last aircraft the tool had been used on. If this can be established, a search will begin on that aircraft to try and locate the tool. If, within some reasonable period of time, the tool cannot be found (usually two to three hours) a Quality Deficiency Report (QAR) will be generated to document the lost tool. The search will continue with a quality assurance representative participating in the search. This effectively places the aircraft in "Downed Status" (un-flyable). If the tool is found, the QAR will be signed off and will remain with the aircrafts permanent record. If the tool can not be located, the quality assurance (QA) representative will make a determination as to whether to release the aircraft as safe for flight. The QA representative also has the option of having the aircraft x-rayed in a further attempt to find the missing tool. This is a costly remedy and is generally used in instances where the area in which the tool was lost is considered to be a critical area such as the engine, movable flight surfaces, and the cockpit.

A patent to Mohr, U.S. Pat. No. 6,989,749 assigned to the US Navy, describes an attempt to provide inventory control of tools. As presented, a toolbox would have one 13.56 MHz reader, one antenna, a 13.56 MHz RFID tag embedded wristband, and a 13.56 MHz tag embedded in each tool. As described, a single antenna attached to the reader promulgates the area around the toolbox with a 13.56 MHz signal, which activates (powers up) the tags embedded in both the wristband and tools when removed from the toolbox. Activating the tags results in transmitting this data over a wireless interface to a host computer. By necessity, a 13.56 MHz tag will be small in size which will in turn restricts the read range that can be accomplished with such a small tag. In point of fact, given a tag size of 15-20 mm, the read range typically will be no more than 2 to 4 cm. Given that limitation, it would be impossible for the tag to be activated and accurately read without being within 4 cm of the antenna attached to the reader. It is understandable that this simple method would be desirable from a cost and ease of installation point of view. However, most toolboxes are between 2' and 6' long. Thus, as a practical matter, the Mohr invention results in at least some tools being removed from a toolbox without their tags being read (activated) by the system reader. Further, the Mohr system requires that all the toolboxes be kept in a given secure area to accomplish authorized user accountability.

A need thus exists for a method of improved tool accountability. Further, there is a need for equipment that can accurately and quickly ascertain which tools are returned to a given receptacle such as a toolbox by a given individual. Also, there is a need to have a way of quickly ascertaining what items are still missing from the given receptacle. Further, there is a need to allow the temporary removal of a toolbox from the area in which it is normally stored to a remote worksite while a repair is in process.

SUMMARY

In one aspect, a method for a radio frequency identification (RFID) tagged tool inventory control includes but is not limited to reading a close proximity user RFID tag in association with a given toolbox as a first event; comparing data obtained from said user RFID tag at said first event with users authorized to access said given toolbox; preparing a first inventory list of all presently readable tools initially in said toolbox; reading a close proximity user RFID tag in association with said given toolbox, after closure of said given toolbox, as a second event; preparing a second inventory list of all presently readable tools remaining in said given toolbox; and transmitting a record indicative of the difference between said first and second inventory lists to a database for storage along with an indication of the user that caused the change in toolbox inventory. In addition to the foregoing, other method aspects are described in the claims, drawings, and text forming a part of the present application.

In another aspect, a computing system includes but is not limited to a secure user interface application and an operating system executing on the computing system, including an application programming interface (API) to facilitate communication between the secure user interface application and a voice-capable system wherein the API includes a data structure: to pass logged data identified by a user in a user initiated monitored network interaction; and an operational data structure to enable a user to store the logged data identified by the user using a drag-and-drop utility associated with the secure user interface application. In addition to the foregoing, other computing system aspects are described in the claims, drawing and text forming a part of the present application.

In another aspect, a computer program product includes but is not limited to a signal bearing medium bearing at least one of one or more instructions for a signal bearing medium bearing one or more instructions for reading a close proximity user radio frequency identification (RFID) tag in association with a given toolbox as a first event; one or more instructions for comparing data obtained from said user RFID tag at said first event with users authorized to access said given toolbox; one or more instructions for preparing a first inventory list of all presently readable tools initially in said toolbox; one or more instructions for reading a close proximity user RFID tag in association with said given toolbox, after closure of said given toolbox, as a second event; one or more instructions for preparing a second inventory list of all presently readable tools remaining in said given toolbox; and one or more instructions for transmitting a record indicative of the difference between said first and second inventory lists to a database for storage along with an indication of the user that caused the change in toolbox inventory.

In another aspect, an electronically lockable toolbox is provided that includes a plurality of RFID (radio frequency identification) tagged tools stored in said electronically lockable toolbox, each of said RFID tagged tools having an RFID tag operating as an identifier for each of said tools; a first RFID reader mounted on said electronically lockable toolbox said first RFID reader adapted to read RFID tags for each of said tools to determine tools added as well as tools removed by an authorized user between an event signifying an unlocking and opening of the toolbox and an event signifying a complete closure and locking of said toolbox, said first RFID reader reading and recording the RFID tag for each of said tools which said authorized user removed from and/or added to said electronically lockable toolbox; a close proximity second RFID reader mounted on said electronically lockable toolbox, said close proximity second RFID reader being adapted to read a user supplied RFID device; and an identification device having a radio frequency identification device imbedded therein, said identification device configured to enable a toolbox user to identify said user as an individual authorized to remove one or more of the plurality of RFID tagged tools from and/or add one or more of the plurality of RFID tagged tools to said electronically lockable toolbox.

In another aspect, an apparatus for providing radio frequency identification (RFID) tagged tool inventory control, includes a toolbox configured with a plurality of recesses wherein at least some of said recesses conforms to the shape of given RFID tagged tools; an electronically controlled lock coupled to said toolbox, said electronically controlled lock configured to activate while said toolbox is in a closed condition, said electronically controlled lock further configured to secure tools in said toolbox and operable when deactivated to allow access to said given RFID tagged tools in said toolbox; a first RFID reader coupled to said toolbox, said first RFID reader configured to read each of the given RFID tagged tools in said toolbox; a user identifier operable to generate a first event signal that an identified user wishes to access the contents of said toolbox and to generate a second event signal when said identified user wishes to close and secure access to the contents of said toolbox; and logic means, electrically connected to said electronically controlled lock, said first RFID reader and said user identifier, said logic means configured to (a) initiate a scan of a one or more tagged tools in said toolbox upon receipt of said first event signal, (b) record the identity of the identified user initiating said first event signal, (c) generate a first list of the one or more tagged tools detected in the toolbox, (d) deactivate said lock means whereby the one or more tagged tools in the toolbox may be accessed, (e) activate said lock whereby the one or more tagged tools in the toolbox may no longer be accessed upon receipt of said second event signal, (f) initiate a second scan of the one or more tagged tools in said toolbox, (g) record the identity of the user initiating said second event signal, (h) generate a second list of the one or more tagged tools detected in the toolbox, and (i) generate, after comparing said first and second list, a record of the one or more tagged tools removed and/or added to said toolbox between said first and second event signals.

In another aspect, a method for providing radio frequency identification (RFID) RFID tagged tool inventory control of a toolbox includes but is not limited to preparing a first inventory list of all presently readable tools initially in said toolbox before allowing identified user access to said toolbox; preparing a second inventory list of all presently readable tools remaining in said toolbox upon completion of closing and locking of said toolbox; and generating a record indicative of any differences between said first and second inventory lists for transmission to a database along with an indication of the user that accessed the toolbox.

In one or more various aspects, related systems include but are not limited to circuitry and/or programming for effecting the herein-referenced method aspects; the circuitry and/or programming can be virtually any combination of hardware, software, and/or firmware configured to affect the herein-referenced method aspects depending upon the design choices of the system designer. In addition to the foregoing other system aspects are described in the claims, drawings, and text forming a part of the present application.

In one aspect, a toolbox includes but is not limited to an electronically controlled lock; a radio frequency identification (RFID) reader coupled to the electronically controlled lock, the RFID reader configured to detect each of a plurality of tagged tools in said toolbox; first event logic means, connected to said electronically controlled lock and to said reader, said first event logic means configured to prepare a first inventory list of each of a plurality of readable tools initially in said toolbox before deactivating said electronically controlled lock to allow access to said toolbox; second event logic means coupled to said electronically controlled lock and to said RFID reader, for preparing a second inventory list of each of the plurality of readable tools remaining in said toolbox subsequent to activating said electronically controlled lock; and report means operable to access said first and second inventory lists and to generate a record indicative of any differences between said first and second inventory lists for transmission to a database along with an indication of the user that accessed the toolbox. In addition to the foregoing, other communication device aspects are described in the claims, drawings, and text forming a part of the present application.

In addition to the foregoing, various other method, system, and/or computer program product aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

For a more complete understanding of one or more embodiments of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed or implemented in either hardware or software, or some combinations thereof. In a preferred embodiment, however, the functions are performed by a processor such as a computer, microcontroller or an electronic data processor in accordance with code such as computer program code, software, and/or integrated or other electronic circuits that are coded to perform such functions, unless indicated otherwise.

Figure 1:
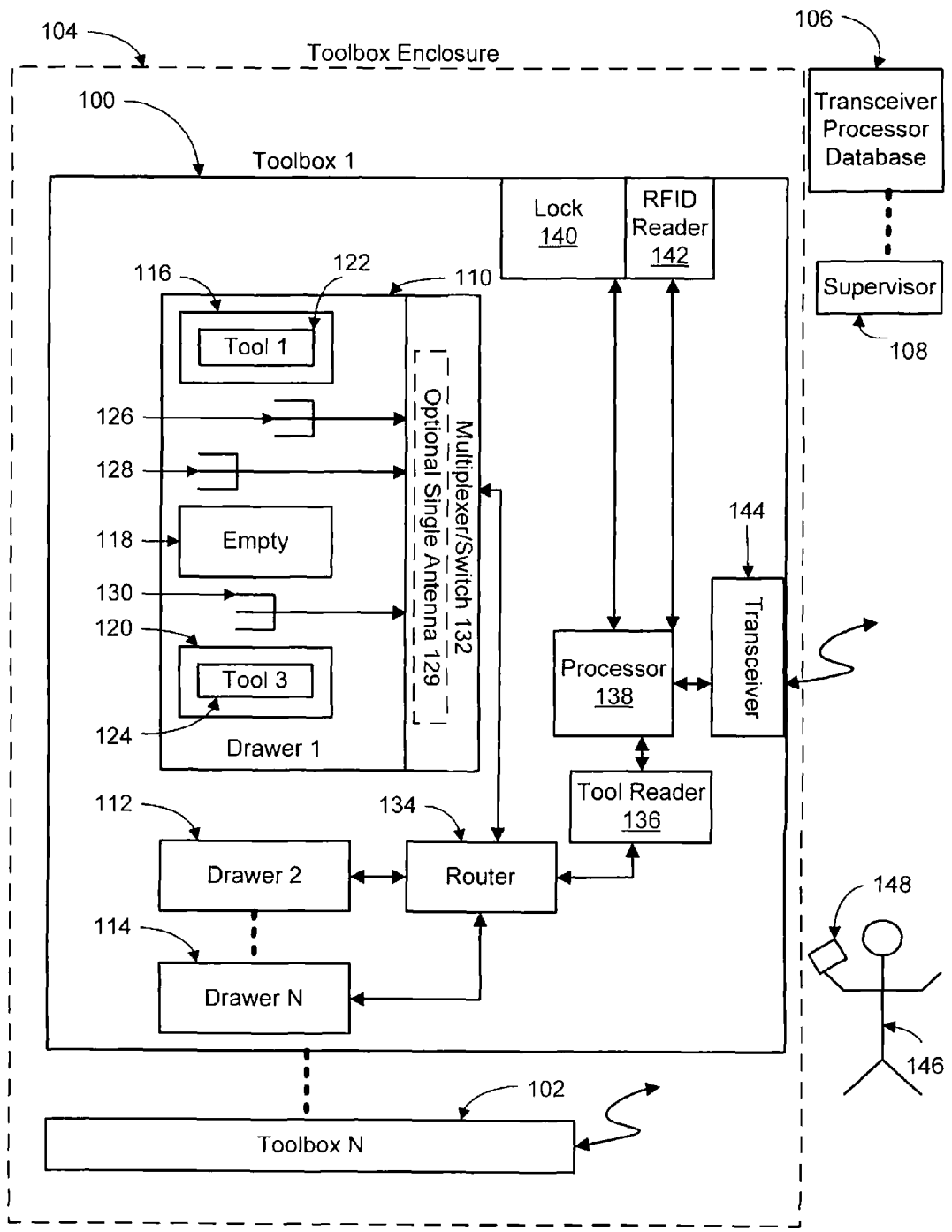
FIG. 1 is a block diagram of the basic components of a toolbox inventory system illustrating one or more embodiments of the present application.

In FIG. 1, a toolbox 1 is designated as 100 while a second toolbox N is shown as 102. The toolbox 102, although not specifically shown as such, can contain all the RFID tag detection components and communication capability to be detailed in connection with box 100. Dashed line 104 is indicative of where the toolboxes are normally stored when not in use. A block 106 represents equipment used to communicate with the toolbox electronics and store and/or output data relevant to the inventory process. While the communication between block 106 and the toolboxes is shown as, and is preferably wireless, it may also be hardwired on an "as needed" basis. A supervisory user 108 is indicated as interfacing with the block 106 for providing inventory audit or control of a plurality of toolboxes 1 through N.

Toolbox 100 is shown as having a plurality of drawers 1, 2 and N designated as 110, 112 and 114 respectively. Drawers can be a material composition that can be composite, fiberglass and/or carbon fiber as would be appropriate for an RF friendly environment. Alternatively, tool grade steel or other metals can be used for the drawer. If the drawer is made of metal, a shielding pad can be employed to reduce or eliminate signal scatter. The shield could be composed of several different material types such as copper or other RF absorbing materials. In one embodiment, shielding can be an insulating shielding such as a rubber spray or the like.

Drawer 110 is shown to include three tool conforming receptacles or cavities 116, 118 and 120. A RFID tagged tool 1 is shown placed within cavity 116. A further RFID tagged tool 3 is shown in position in cavity 120 while the cavity 118 is empty. Three antennas 126, 128 and 130 are shown adjacent cavities 116, 118 and 120 respectively. These antennas are positioned to be able to read the RFID tags of tagged tools when the tools are correctly inserted in the appropriate cavity. Preferably each cavity, such as 120 is formed to fit only a given tool. In one embodiment, the cavity in which each tool is located can also be used to assist in the proximity of the embedded tool tag to an embedded antenna. For example, a high density foam pad can be used to force the placement of the tool as it relates to a tag embedded in the tool with respect to the physical relation to an antenna. More particularly, foam can be etched out of areas for a specific tool such that a tag can be embedded in a position closer to an antenna. If an antenna is at the bottom of a drawer, a lower-most position on tool can be embedded with a tag. The cavity for each tool can be formed such that the tool can be placed in the cavity only in a given orientation whereby the RFID tag can be accurately activated and read by the appropriate adjacent and/or nearby antenna. The foam itself could also be configured to provide shielding by including wire mesh or other EMI shielding material as will be appreciated by those of skill in the art with the benefit of the present disclosure.

In one embodiment, the antennas can be small antennas that range in size according to system requirements, the size of the drawer and the limitations of the physical requirements of the tools and tool drawer. Antennas can be square, round, or an appropriate shape to accommodate placing an antenna under a tag embedded in a tool. The three antennas 126, 128 and 130 are shown to be connected through a multiplexer and/or a switch 132 and a router 134 to a tool tag reader 136. Multiplexer/switch 132 is optionally directly coupled to optional single antenna 129.

If multiplexer/switch 132 is configured as only a switch, according to an embodiment, each antenna can be routed by a wire coupled to the switch. Such a switch could then operate as a gate keeper for any signal coming from a reader coupled thereto, such as reader 136. Such a switch 132 could therefore selecting one antenna at a time or in groups according to system requirements.

If multiplexer/switch 132 is configured as a multiplexer, signals from one or more readers can be configured to transmit continuously to each antenna.

In one embodiment, a reader can be embedded into the large antenna or into an antenna array. Alternatively, antennas can be inlayed into a plastic sheet or other substrate in series to strategically place the antenna run directly under each tool tag. By placing the antenna and tool tag in close proximity, systems communicate distances via communications wires routed from each drawer to a communications module. Using communications wiring such as 26 g stranded wire provides a benefit by providing greater tolerance to bend radiuses than antenna wires, in which coaxial wire must be used in applications where wire lengths exceed two to three feet. The remaining drawers 112 and 114 are also shown connected to reader 136 through router 134. The reader 136 may include a processor or other logic circuitry, not shown, performing inventory data gathering tasks or it may react to instructions from a separate processor such as processor 138 shown connected to reader 136. A toolbox lock 140 and an associated toolbox user close proximity RFID reader block 142 are also shown connected to processor 138. A transceiver 144 is also connected to processor block 138 for providing wireless communication with database block 106. FIG. 1 illustrates reader 136, processor 138. RFID reader block 142 and transceiver 144 are disposed within toolbox 1 100 in accordance with an embodiment. It will be appreciated by those of skill in the art that some components and/or a subset of components necessary to operate the system, such as transceiver 144, RFID reader 142 and processor 138 can also be attachable to a toolbox to prevent lock 140 from being tampered with if toolbox 100 is in transit. Alternatively, components can be maintained within toolbox 100 to maintain a constant synchronization with other network components.

Although not shown, the processor may be self powered such that it can operate when not within enclosure 104. Further, the processor block 138 may include data storage capability such that any events of tool removal and tool replacement may be recorded and stored when the toolbox electronics is located remote from or otherwise not in communication with central database block 106. A stick man representation of a toolbox user is designated as 146. User 146 is shown with a RFID user tag 148, in the form of a badge, card, wrist band or other device means of user identification.

Figure 2:
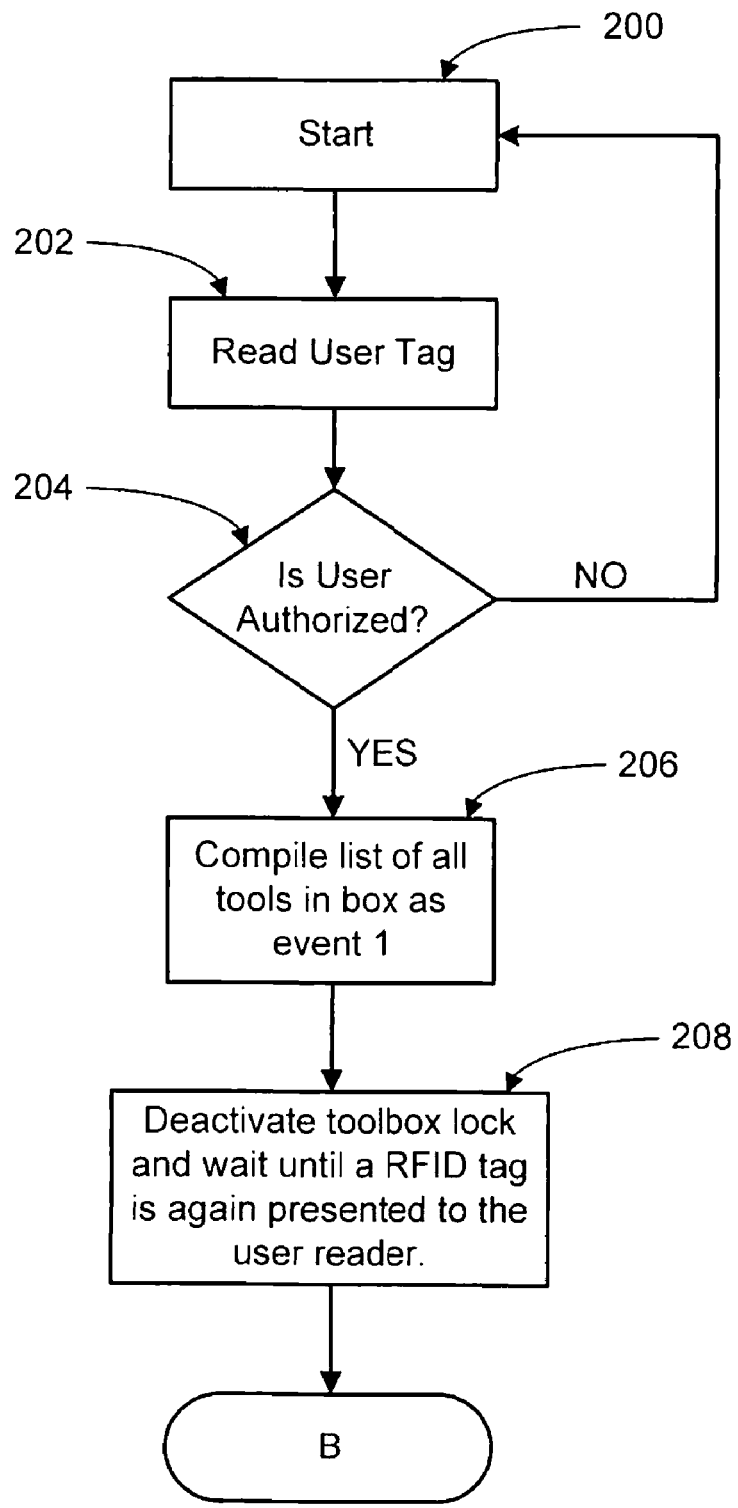
FIGS. 2 and 3 illustrate a flow diagram of the operation of the toolbox logic performed when a user accesses and inserts and/or removes tagged tools from a given toolbox in accordance with an embodiment of the present application.
Figure 3:
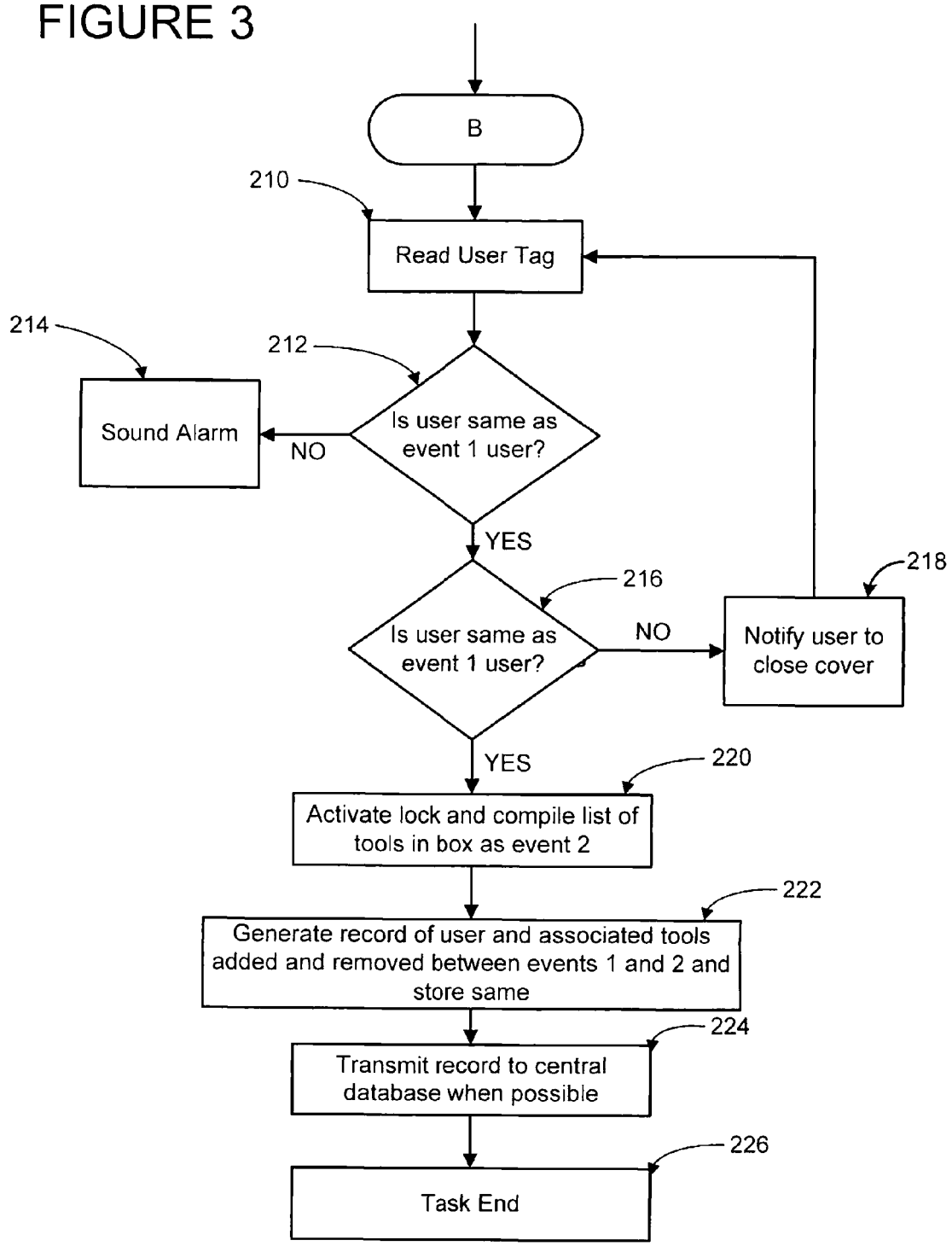

Reference will now be made to FIG. 2 in combination with FIG. 1. More particularly, according to one an embodiment, an information management system includes logic configured to control the readers and the toolbox and/or a host database. The location of the information management system can be determined according to system requirements. In some embodiments, components of the information management system can be located within the toolbox to allow for inventory tracking and access control when the toolbox is outside the range of the established communication network.

When a user, such as 146, approaches a toolbox, such as 100, he positions an RFID tag, such as 148, near the reader 142. This action causes logic within either reader 142 or processor 138 to pass from start block 200 to the read user tag block 202. The logic compares the data read with a list of authorized users. A list of authorized users may be obtained from the central database 106 if the toolbox 100 is presently in communication with block 106. If the transceiver block 144 is not able to communicate with block 106, a list of authorized users stored within processor 138 can be used. Typically, the list of authorized users will be updated on some predetermined basis whereby users no longer authorized cannot remove tools from the toolbox. To accommodate communication between an RFID tag, reader and a database holding a list of authorized users, communication connections can exist between antennas, switches, multiplexers and a host database. The communication connections can be wireless, through CAT 5 cabling and/or other hard-wired standards, which will be appreciated by those of skill in the art and determined to be appropriate for the dictates of system requirements for an operating environment of the system.

If a determination is made in a decision block 204 that the user 146 is not presently authorized, the logic is shown as returning to the start position. Alternatively such a determination may be used to sound an alarm or notify the supervisor block 108 before returning to start block 200.

If, on the other hand, when it is determined that the user is authorized to access the toolbox, the logic, in block 206, compiles a list of all the tools in the toolbox as an event 1 by scanning all the tagged tools in the box and recording the data. The compiled list will typically also include the identity of the individual accessing the toolbox. The next block, shown as block 208, is to deactivate an electronically controlled lock of the toolbox as represented by block 140. The electronically controlled lock 140 may be a latching type which is changed between open and closed conditions and back again each time it receives a signal. The lock 140 may also be of the type that is in an open or unlocked condition only when a deactivating signal is applied. In some applications, it may be desired that the lock 140 be in a locked or closed position only when an activating signal is applied. Thus, when the terms "deactivate" and "activate" are used with respect to the lock 140, these terms are be used relative the "open" and "closed" conditions of the lock respectively and not relative the electrical signal being used to alter the condition of the lock. The logic waits, in an idle mode, until a user again presents a user tag to the toolbox reader such as block 142. During this idle mode time, the user, such as 146 opens the toolbox and removes tools from the toolbox and/or replaces tools previously removed. When the user has completed the removal and replacement of tools, the user closes the toolbox such that it can be locked. In some toolbox designs, it may be necessary to have electrical contacts that are used to signify, to the logic circuitry, that all movable portions, such as drawers, have been returned to a position whereby activation of toolbox lock 140 will prevent unauthorized access to the toolbox. When the user believes that the toolbox is properly closed the users tag is again presented to the user tag reader, such as 142. This causes the logic to proceed to block 210 to read the user tag. If, in next block decision block 212, it is determined that a user different from the user initiating event 1 is attempting to close the toolbox, the logic proceeds to block 214 and sounds an alarm and/or notifies the supervisor 108.

If it is determined in block 212, that the same user is requesting locking of the toolbox that initially requested access to the toolbox, the logic proceeds to block 216 to attempt to lock the toolbox. The logic will check to make sure that any appropriately required drawer or cover contacts are engaged thereby signifying that the lock can be activated and the toolbox placed in a secure condition. If a determination is made in decision block 216 that the toolbox cannot be secured, the user is notified, in block 218, and the logic returns to block 210 and waits until the user again uses the tag to attempt to lock the toolbox. The notification of block 218 can be merely a warning beep. Alternatively, it may be desirable to supply the user with a printed or otherwise visual notice and/or may additionally involve a notification to the supervisor 108 that there may be a security breach.

When, in block 216, it is determined that the toolbox is in a condition to be locked, the lock is activated in the next block of block 220. At this time a scan or sweep of all the tagged tools in the toolbox is again performed to generate a list of tools as an event 2. The logic continues to block 222 wherein the lists of events 1 and 2 are compared and a record is generated of the user, the tools added and/or the tools removed along with any additional desired information such as date and time. Then, in block 224, this record is transmitted to the central database 106 when possible. The record may also be stored in the toolbox processor and the centralized database. The task is then completed in the next block 226.

The record generated can be standardized, customized and/or recorded as an ad hoc output as required for specific business requirements.

Although not shown in FIG. 2, the scanning process can be initiated at any time either at the toolbox or by a supervisor from the central database 106 to generate a report of tagged tools in their appropriate positions in the toolbox or alternatively a list of tools missing from the toolbox. Such a list would normally be generated at the end of a shift to ascertain if there is a need to find misplaced tools. The records previously generated will greatly facilitate ascertaining who last checked out any given missing tool. In one embodiment, data synchronization occurs between on-board memory and a host database when the toolbox enters or resides (real time) within an established communication network.

As will be apparent to those skilled in the art, for some of the higher frequencies used in RFID tag detection, the drawer material, if sheet metal or other ferrite, could affect the accuracy of reading tag data. This problem is typically caused by reflection of the radio frequency signal emitted by the reading antenna. Solutions to this problem are many and varied. A signal absorbing shield such as a copper mesh can be placed between the antennas and the metal of the drawer. As is known, the further the antenna is from a radio frequency signal reflecting surface relative to the distance between the antenna and a RFID tag to be read, the more reliable the reading of the tag. Accordingly, insulation may be used to create a space between the antenna and drawer metal. An advantage of using a solid or foam insulation in this manner for spacing, is that a cavity for tool placement can easily be made, in this same insulation, that conforms to each given tools shape. When using insulation in this manner, the antenna may easily be secured in a position, spaced from the drawer metal and in close proximity to a RFID tag of the tool appropriate for a given cavity. Drawers however may utilize materials that do not reflect radio frequency signals such as plastic to minimize the depth of the drawer required to accommodate a given set of tools. Although a preferred embodiment of the invention comprises using drawers to contain and position a majority of the tagged tools for the scanning process, trays and other devices may be used in place of or in addition to drawers.

A preferred embodiment of this invention is shown to utilize a separate antenna for each tagged tool to be inventoried, but it may be desirable to use an antenna that is positioned to read more than one tool in a drawer. In other words, a single antenna, in an appropriate environment, such as a non-metallic drawer, may be used to read all of or at least a plurality of the tools in a given drawer.

In a similar manner, FIG. 1 illustrates using a router 134 to combine the outputs from a plurality of drawer multiplexers, the signals from the various antennas in a given toolbox may be supplied to reader 136 in others ways known to those in the switching art.

Although the preferred embodiment of the invention incorporates a RFID reader for the user that is separate from that used to inventory the tools, the two functions may also readily be incorporated into a single unit along with the processor and appropriate data and computer program storage means. Also, for some applications, it may be desirable to incorporate a user identification device other than a RFID reader. Such other ID devices may well be retina scanners, fingerprint devices and so forth.

Figure 4:
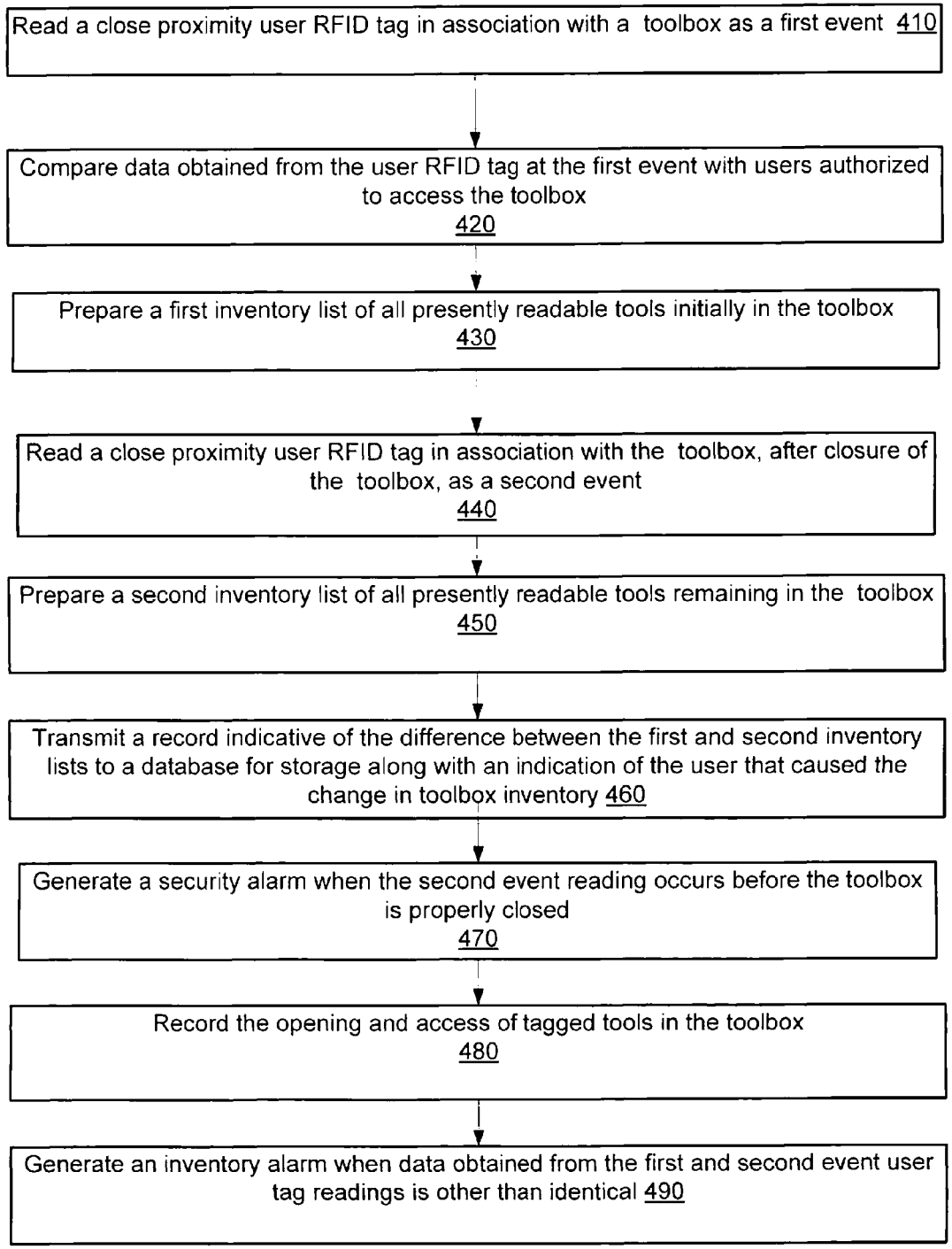
FIG. 4 illustrates a flow diagram of a method in accordance with an embodiment of the present application.

Referring now to FIG. 4, a flow diagram illustrates an embodiment of a method an RFID tagged tool inventory control. Block 410 provides for reading a close proximity user RFID tag in association with a given toolbox as a first event. Block 420 provides for comparing data obtained from the user RFID tag at the first event with users authorized to access the toolbox. The comparing the data can be performed in a logic module incorporated into a processor or other computing device. The comparing data can include enabling an unlocking of the toolbox if the RFID tag is authorized according to the comparison. For certain operating environments, the logic to compare and unlock the toolbox can be incorporated into on-board system components to enable entry and inventory tracking when the toolbox is temporarily outside the range of the communication network. Upon re-entering the established network, data saved within the on-board memory can be transferred to a host database under protocols defined based on the operating environment considerations.

Block 430 provides for preparing a first inventory list of all presently readable tools initially in said toolbox. The first inventory list can be stored in cache and updated upon a scheduled event or the like or be updated upon detecting that a user is authorized to access the toolbox. Block 440 provides for reading a close proximity user RFID tag in association with the toolbox, after closure of said given toolbox, as a second event. In one embodiment, the reading after closure is performed immediately after closure. In other embodiments, the second reading occurs when a signal to perform an inventory is received over a network connection. For example, an inventory control could be configured to send a signal to perform inventories.

Block 450 provides for preparing a second inventory list of all presently readable tools remaining in the toolbox. Block 460 provides for transmitting a record indicative of the difference between said first and second inventory lists to a database for storage along with an indication of the user that caused the change in toolbox inventory. Each of the first and second inventory lists can be generated by addressing at least one antenna placed in proximity to at least one RFID tagged tool, retrieving data from each tagged tool in proximity to said antenna, and assembling retrieved data into an inventory list.

Block 470 provides for generating a security alarm when the second event reading occurs before the toolbox is properly closed. The security alarm can be configured to cause the toolbox to lock or cause a message to be sent via a network connection to authorities. Block 480 provides for recording the opening and access of tagged tools in the toolbox. In an embodiment, the toolbox can be configured to permit access upon recording the opening of the toolbox if an authorized user is detected. In one embodiment, a time and/or date time stamp of a transaction such as recording of inventory change and associated identification device occurs each time a toolbox is opened or closed or a transaction occurs. Recording of a second inventory list can be stored on on-board memory (e.g. flash memory, reader memory or alternative memory form). Alternatively, either or both of the first and second inventory lists can be recorded into a host database if the toolbox is in range of the established communication network. In one embodiment, data is recorded both on-board and within the host database.

Block 490 provides for generating an inventory alarm when data obtained from said first and second event user tag readings is other than identical. The inventory alarm can be configured as a security alarm that causes a message to be sent via the network connection to authorities or can cause other toolboxes networked to the toolbox to be electronically locked and/or to cause an inventory list to be generated for each other toolbox networked thereto.

Figure 5:
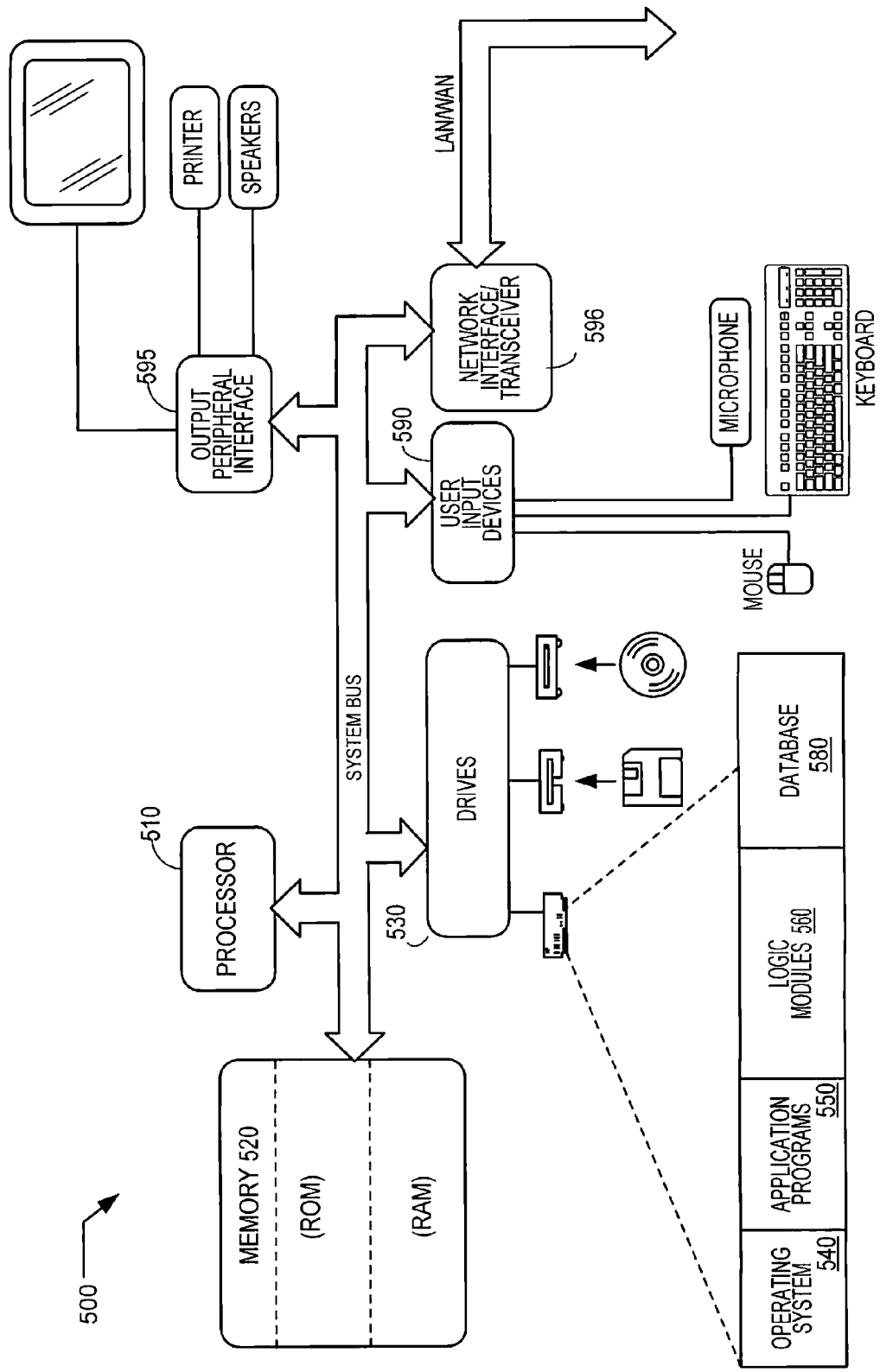
FIG. 5 illustrates a computer system appropriate for one or more embodiments of the present application.

With reference to FIG. 5, depicted is an exemplary computing system for implementing embodiments. FIG. 5 includes a computer 500, including a processor 510, memory 520 and one or more drives 530. The drives 530 and their associated computer storage media, provide storage of computer readable instructions, data structures, program modules and other data for the computer 500. Drives 530 can include an operating system 540, application programs 550, logic module 560 and database 580. Database 580 can be configured to hold one or more inventory lists. Computer 500 can optionally further include user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like. These and other input devices can be connected to processor 510 through a user input interface that is coupled to a system bus, but may be connected by other interface and bus structures, such as a parallel port, game port or a universal serial bus (USB). Computers such as computer 500 may also include other peripheral output devices such as speakers, which may be connected through an output peripheral interface 595 or the like.

Computer 500 may operate in a networked environment using logical connections to one or more computers, such as a remote computer connected to network interface 596. The remote computer may be a personal computer, a server, a router, a network PC, a peer device or other common network node, and can include many or all of the elements described above relative to computer 500. Networking environments are commonplace in offices, enterprise-wide computer networks, intranets and the Internet. For example, in the subject matter of the present application, computer 500 may be directly coupled to a toolbox 100 or comprise the source machine from which data is being migrated, and the remote computer may comprise the destination machine. Note however, that source and destination machines need not be connected by a network or any other means, but instead, data may be migrated via any media capable of being written by the source platform and read by the destination platform or platforms, such as RFID type means. When used in a LAN or WLAN networking environment, computer 500 can be connected to the LAN through a network interface 596 or an adapter. When used in a WAN or LAN networking environment, computer 500 typically includes a modem or other means for establishing communications over the WAN or LAN, such as the Internet. It will be appreciated that other means of establishing a communications link between the computers may be used.

According to one embodiment, computer 500 is connected in a networking environment such that the processor 510 and/or a logic module 560 configured for implementing the logic of FIG. 2 and/or FIG. 4 and can determine whether incoming data is a list of authorized users from an RFID reader. The incoming data can be from a toolbox with communication device or from another data source. The logic described in FIG. 2 or a portion thereof can be code stored in memory 520. For example, processor 510 can determine whether an incoming transmission is from a toolbox or associated reader and determine that a next portion of logic is necessary and proceed with the logic of FIG. 2.

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Although the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g. a car, truck, locomotive, tank, armored personnel carrier, etc.), (c) a building (e.g., a home, warehouse, office, etc.), (d) an appliance (e.g. a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g. the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations." without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g. "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. An electronic checkout system comprising:
an electronically lockable toolbox;
a plurality of RFID (radio frequency identification) tagged tools stored in said electronically lockable toolbox each of said RFID tagged tools having an RFID tag operating as an identifier for each of said tools;
a first RFID reader mounted on said electronically lockable toolbox, said first RFID reader adapted to read RFID tags for each of said tools to determine tools added as well as tools removed by an authorized user between an event signifying an unlocking and opening of the toolbox and an event signifying a complete closure and locking of said toolbox, said first RFID reader reading and recording the RFID tag for each of said tools which said authorized user removed from and/or added to said electronically lockable toolbox;

a close proximity second RFID reader mounted on said electronically lockable toolbox, said close proximity second RFID reader being adapted to read a user supplied RFID device, wherein said second RFID reader is configured to read the radio frequency identification device of said identification device and configured to determine when the individual attempting to close a toolbox is the same authorized individual user that caused the toolbox to be unlocked and opened, said second RFID reader further configured to activate a toolbox lock when it is determined that the individual attempting to close the toolbox is the same authorized user and all electrical contacts of the toolbox indicate a complete closure;

and an identification device having a radio frequency identification device imbedded therein, said identification device configured to enable a toolbox user to identify said user as an individual authorized to remove one or more of the plurality of RFID tagged tools from and/or add one or more of the plurality of RFID tagged tools to said electronically lockable toolbox.

2. The system of claim 1 wherein said second RFID reader reading the radio frequency identification device of said identification device is configured to determine when the individual attempting to open a toolbox is an authorized user, said second RFID reader further configured to de-activate a toolbox lock when it is determined that the individual attempting to open a toolbox is an authorized user.

3. The system of claim 1 further comprising:

a wireless link having an antenna, said wireless link being connected to a network;

a database connected to said network, said database including a list of employees authorized to remove said portable tools from and/or add tools to said toolbox and a list of any tagged tools not presently in appropriate positions within a given toolbox; and transceiver means comprising a part of each of said first and second RFID readers, said transceiver means configured to communicate between said readers and said database.

4. An apparatus for providing radio frequency identification (RFID) tagged tool inventory control the apparatus comprising:

a toolbox configured with a plurality of recesses wherein at least some of said recesses conforms to the shape of given RFID tagged tools;

an electronically controlled lock coupled to said toolbox, said electronically controlled lock configured to activate while said toolbox is in a closed condition, said electronically controlled lock further configured to secure tools in said toolbox and operable when deactivated to allow access to said given RFID tagged tools in said toolbox;

a first RFID reader coupled to said toolbox, said first RFID reader configured to read each of the given RFID tagged tools in said toolbox;

a user identifier operable to generate a first event signal that a first identified user wishes to access the contents of said toolbox and to generate a second event signal when a second identified user wishes to close and secure access to the contents of said toolbox;

logic means, electrically connected to said electronically controlled lock, said first RFID reader and said user identifier, said logic means configured to:
(a) initiate a scan of one or more tagged tools in said toolbox upon receipt of said first event signal,
(b) record the identity of the first identified user initiating said first event signal,
(c) generate a first list of the one or more tagged tools detected in the toolbox,
(d) deactivate said lock means whereby the one or more tagged tools in the toolbox may be accessed,
(e) activate said lock whereby the one or more tagged tools in the toolbox may no longer be accessed upon receipt of said second event signal,
(f) initiate a second scan of the one or more tagged tools in said toolbox,
(g) record the identity of the second identified user initiating said second event signal,
(h) generate a second list of the one or more tagged tools detected in the toolbox,
(i) generate after comparing said first and second list, a record of the one or more tagged tools removed and/or added to said toolbox between said first and second event signals, and
(j) determining if the second identified user is the same as the first identified user.

5. The apparatus of claim 4 wherein said user identifier comprises a close proximity RFID reader circuitry operable lo read a tagged identification and said logic means includes a transmitter configured send data related to at least one of the one or more tagged tools contained removed, added and/or missing from said toolbox to a remote database.

6. A method for providing radio frequency identification (RFID) RFID tagged tool inventory control of a toolbox, the method comprising:

reading RFID tags of a plurality of tools stored in the toolbox by a first RFID reader;

reading a radio frequency identification device by a second RFID reader to identify an authorized user accessing the toolbox;

preparing, by logic means connected to at least the first RFID reader, a first inventory list of all presently readable tools initially in said toolbox before allowing the authorized user access to said toolbox;

determining, by the logic means, if an individual attempting to close the toolbox is the same authorized user that caused the toolbox to be unlocked and opened;

activating a toolbox lock when it is determined that the individual attempting to close the toolbox is the same authorized user and all electrical contacts of the toolbox indicate a complete closure;

preparing, by the logic means, a second inventory list of all presently readable tools remaining in said toolbox upon completion of closing and locking of said toolbox; and generating a record indicative of any differences between said first and second inventory lists for transmission to a database along with an indication of the authorized user that accessed the toolbox.

7. The method of claim 6 further comprising checking the identification of a user attempting access to said toolbox against a list of authorized users before allowing access to said toolbox.

* * * * *